J. Britton,

Kettle Bail.

No. 106,115. Patented Aug. 9, 1870.

Witnesses:
Gustave Dieterich
S. S. Mabee

Inventor:
J. Britton
per Munn & Co.
Attorneys.

UNITED STATES PATENT OFFICE.

JAMES BRITTON, OF WILLIAMSBURG, NEW YORK, ASSIGNOR TO HIMSELF AND GARRETT BROWER, OF SAME PLACE.

IMPROVEMENT IN KETTLE-BAILS.

Specification forming part of Letters Patent No. 106,115, dated August 9, 1870.

*To all whom it may concern:*

Be it known that I, JAMES BRITTON, of Williamsburg, county of Kings and State of New York, have invented a new and useful Improvement in Ket le-Bails; and I do hereby declare that the following is a full, clear, and exact description thereof, which will enable others skilled in the art to make and use the same, reference being had to the accompanying drawing, forming part of this specification.

The object of this invention is to strengthen the ears and points of connection of the bail of a tea-kettle with the ears, and so form the handle portion of the bail that it shall fit the hand; and it consists in the construction and arrangement as hereinafter described.

Figure 1:
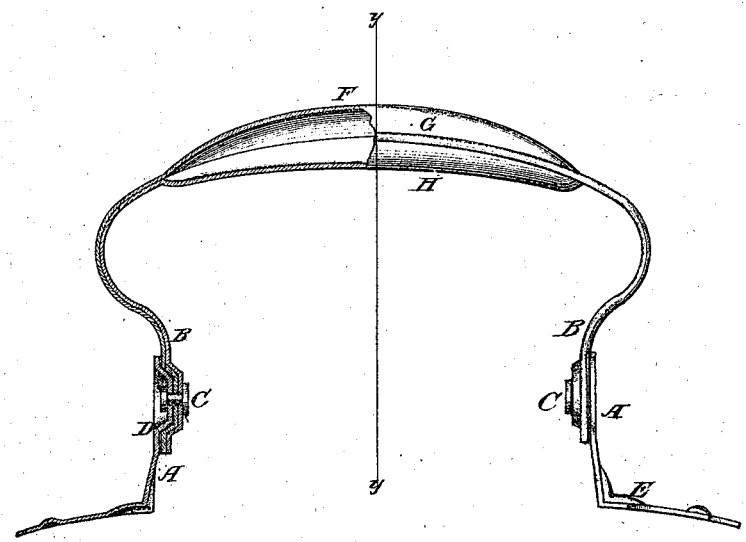
Figure 2:
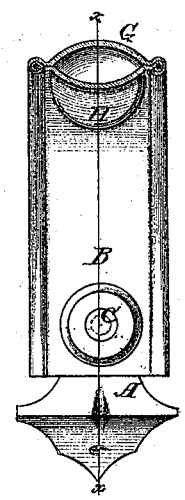

In the accompanying drawing, Figure 1 is a section of Fig. 2 on the line $x\ x$. Fig. 2 is a cross-section of the bail on the line $y\ y$ of Fig. 1.

Similar letters of reference indicate corresponding parts.

A represents the ears, which are fastened to the top of the kettle in the usual manner. B represents the legs of the bail. At the points of contact where the rivets C pass through the ears and the bail indentations are made, so as to form cavities on the outside and projections on the other side; and the ears A are formed to fit as seen in the sectional portion of Fig. 1. By this formation shoulders on the bail and on the ears are brought in contact and made bearing-surfaces, so that when the kettle is raised by the bail the rivets C are relieved of the greater portion of the weight, and the connection of the bail with the kettle is rendered durable. This formation is plainly seen at D in Fig. 1.

E a is b ace in the angles of the ears, which is formed as the ear is struck out, and which serves to greatly strengthen the ear at a usually weak point.

F represents the handle portion of the bail, upon both sid s of which are circular projections G and H, which taper from the center to the ends of the projections, as seen in Fig. 1.

This form renders the kettle much easier and more convenient to handle in lifting and pouring out water.

These improvements go far to perfect and render convenient and durable an article in daily use in almost every dwelling in the land.

Having thus described my invention, I claim as new and desire to secure by Letters Patent—

1. The handle F, constructed as described.
2. The hinged joint constructed as described, by which the leg B and ear A are united, as set forth.

The above specification of my invention signed by me this 21st day of March, 1870.

JAMES BRITTON.

Witnesses:
   E. TATE,
   GEO. W. MABEE.